(12) United States Patent
Windsor

(10) Patent No.: US 11,823,538 B2
(45) Date of Patent: Nov. 21, 2023

(54) SYSTEMS AND METHODS FOR INCORPORATING PASSIVE WIRELESS MONITORING WITH VIDEO SURVEILLANCE

(71) Applicant: Fortinet, Inc., Sunnyvale, CA (US)

(72) Inventor: Carl Windsor, Santa Clara, CA (US)

(73) Assignee: Fortinet, Inc., Sunnyvale, CA (US)

( * ) Notice: Subject to any disclaimer, the term of this patent is extended or adjusted under 35 U.S.C. 154(b) by 115 days.

(21) Appl. No.: 17/481,521

(22) Filed: Sep. 22, 2021

(65) Prior Publication Data

US 2023/0087497 A1 Mar. 23, 2023

(51) Int. Cl.
*G08B 13/196* (2006.01)
*H04N 7/18* (2006.01)

(52) U.S. Cl.
CPC ... *G08B 13/19608* (2013.01); *G08B 13/1966* (2013.01); *G08B 13/19645* (2013.01); *G08B 13/19693* (2013.01); *H04N 7/181* (2013.01); *H04N 7/188* (2013.01)

(58) Field of Classification Search
CPC ........ G08B 13/19608; G08B 13/19645; G08B 13/1966; G08B 13/19693; H04N 7/181; H04N 7/188
See application file for complete search history.

(56) References Cited

U.S. PATENT DOCUMENTS

| | | | |
|---|---|---|---|
| 5,291,180 A * | 3/1994 | Reeb | H03H 5/02 257/E27.114 |
| 10,963,893 B1 * | 3/2021 | Sharma | G06F 18/256 |
| 11,354,683 B1 * | 6/2022 | Shin | G06Q 30/0201 |
| 2002/0021231 A1 * | 2/2002 | Schlager | G08B 21/0269 340/984 |
| 2013/0225199 A1 * | 8/2013 | Shaw | G06Q 30/0201 455/456.1 |
| 2015/0373281 A1 * | 12/2015 | White | G06F 16/7867 348/660 |
| 2017/0090007 A1 * | 3/2017 | Park | H04W 4/021 |
| 2019/0311061 A1 * | 10/2019 | Peterson | G06F 16/2477 |
| 2019/0370562 A1 * | 12/2019 | Yigit | G06V 20/52 |
| 2020/0005615 A1 * | 1/2020 | Madden | G08B 13/19608 |
| 2021/0248167 A1 * | 8/2021 | Nadler | G06F 3/0481 |
| 2021/0304577 A1 * | 9/2021 | Hollar | G06K 7/10356 |

* cited by examiner

*Primary Examiner* — Joseph Suh
(74) *Attorney, Agent, or Firm* — Jaffery Watson Mendonsa & Hamilton LLP

(57) ABSTRACT

Various systems and methods for surveillance using a combination of video image capture and passive wireless detection are described. In some cases, the methods include receiving a device identification information from a first wireless access point at a first location and corresponding to a first time, and receiving the device identification from a second wireless access point at a second location and corresponding to a second time. A video from a camera is received, and a travel path is assembled including a portion of the video.

20 Claims, 9 Drawing Sheets

500

Receiving, By A Processing Resource, A Device Identification Information From A First Wireless Access Point At A First Location, Where The Device Identification Information From The First Wireless Access Point Corresponds To A First Time, And The First Wireless Access Point Has A First Region Of Coverage 502

Receiving, By The Processing Resource, The Device Identification Information From A Second Wireless Access Point At A Second Location, Wherein The Device Identification Information From The Second Wireless Access Point Corresponds To A Second Time, And Wherein The Second Wireless Access Point Has A Second Region Of Coverage 504

Receiving, By The Processing Resource, A First Video From A First Camera, Where A Field Of View Of The First Camera Includes At Least A Portion Of The First Region Of Coverage 506

Receiving, By The Processing Resource, A Second Video From A Second Camera, Where A Field Of View Of The Second Camera Includes At Least A Portion Of The Second Region Of Coverage 508

Assembling, By The Processing Resource, A Travel Path Of The First Device Identification Information Including The First Location And The Second Location, And At Least A Portion Of The First Video Within A First Time Window Around The First Time And At Least A Portion Of The Second Video Within The First Time Window Around The Second Time 510

Replaying, By The Processing Resource, The Travel Path Including Simultaneously Displaying The First Video In A First Display Window On A Display And The Second Video In A Second Display Window On The Display, Where The First Display Window Is Accentuated Compared With The Second Display Window During A Second Time Window Around The First Time, And The Second Display Window Is Accentuated Compared With The First Display Window During A Third Time Window Around The Second Time 512

FIG. 5

SYSTEMS AND METHODS FOR INCORPORATING PASSIVE WIRELESS MONITORING WITH VIDEO SURVEILLANCE

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2021, Fortinet, Inc.

BACKGROUND

Field

Embodiments of the present disclosure generally relate to tracking systems, and more particularly to systems and methods for surveillance using a combination of video image capture and passive wireless detection.

Description of the Related Art

Video surveillance systems have been used over a long period of time to monitor, for example, patrons of a retail establishment. Such systems rely upon security personnel watching video feeds for suspicious behavior. When suspicious behavior is identified, the security personnel may approach the individual associated with the suspicious behavior to further investigate. In such cases, the collected video may be used as evidence when criminally charging an individual found to be engaged in illegal activity. Such systems require significant human oversight and are typically only as good as the security personnel operating the systems.

Hence, there exists a need in the art for advanced systems and methods of activity tracking.

SUMMARY

Various embodiments provide systems and methods for activity tracking that include, among other things, passive wireless device identification and tracking. In some embodiments, the information from the passive wireless device identification and tracking is incorporated with video surveillance information to provide a more complete view of the activity.

This summary provides only a general outline of some embodiments. Many other objects, features, advantages and other embodiments will become more fully apparent from the following detailed description, the appended claims and the accompanying drawings and figures.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description applies to any one of the similar components having the same first reference label irrespective of the second reference label.

FIG. 5 is a flow diagram showing a method in accordance with some embodiments for tracking a device identification information and incorporating video into a travel path.

DETAILED DESCRIPTION

Figure 1A:
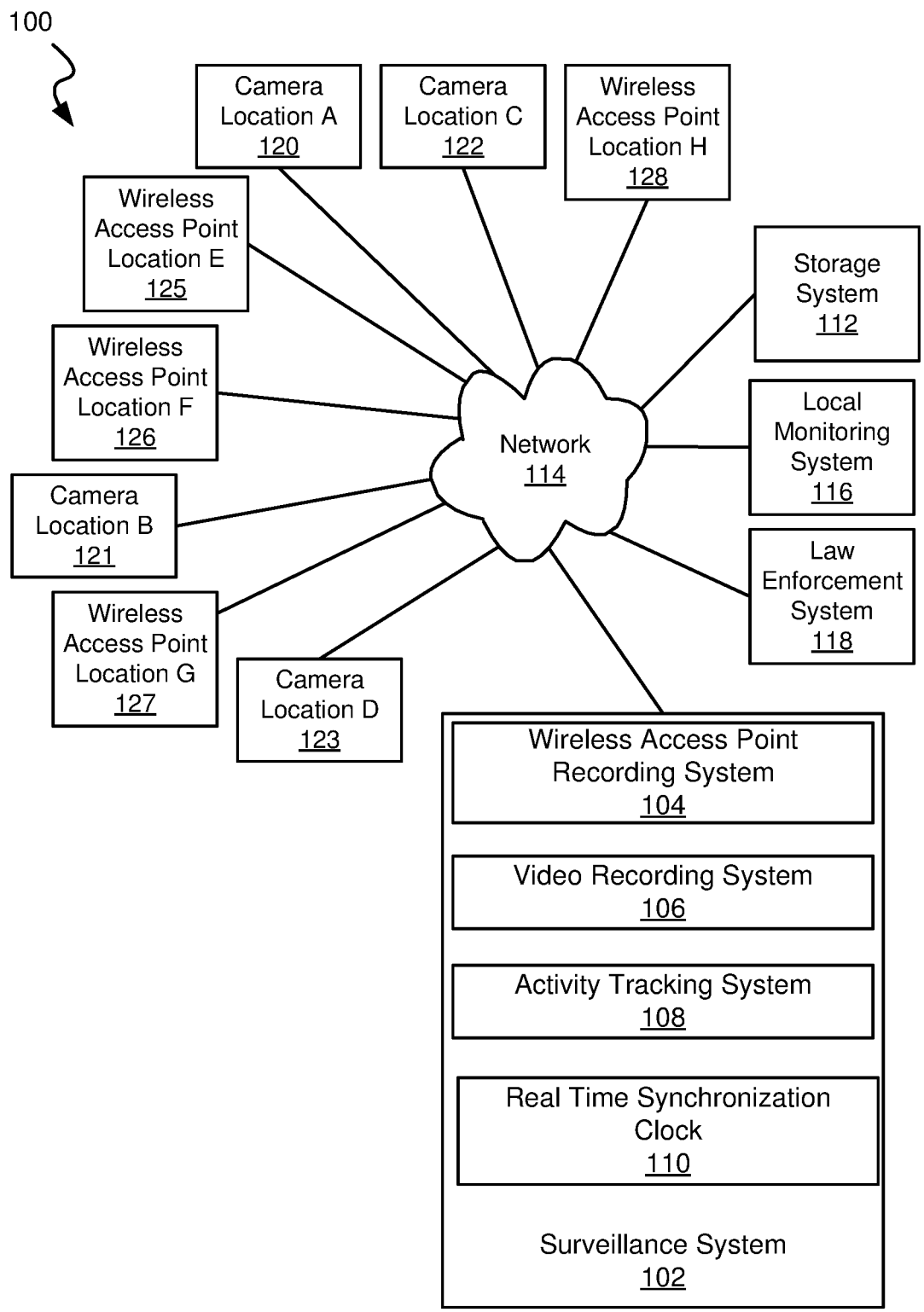
FIGS. 1A-1C illustrate an example network environment including a surveillance system in accordance with some embodiments.

Various embodiments provide systems and methods for activity tracking that include, among other things, passive wireless device identification and tracking. In some embodiments, the information from the passive wireless device identification and tracking is incorporated with video surveillance information to provide a more complete view of the activity.

Embodiments of the present disclosure include various processes, which will be described below. The processes may be performed by hardware components or may be embodied in machine-executable instructions, which may be used to cause a general-purpose or special-purpose processor programmed with the instructions to perform the steps. Alternatively, steps may be performed by a combination of hardware, software, firmware, and/or by human operators.

Various embodiments may be provided as a computer program product, which may include a machine-readable storage medium tangibly embodying thereon instructions, which may be used to program the computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other types of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within the single computer) and storage systems containing or having network access to a computer program(s) coded in accordance with various methods described herein, and the method steps of the disclosure could be accomplished by modules, routines, subroutines, or subparts of a computer program product.

In the following description, numerous specific details are set forth in order to provide a thorough understanding of example embodiments. It will be apparent, however, to one skilled in the art that embodiments described herein may be practiced without some of these specific details Terminology Brief definitions of terms used throughout this application are given below.

The terms "connected" or "coupled" and related terms are used in an operational sense and are not necessarily limited to a direct connection or coupling. Thus, for example, two devices may be coupled directly or via one or more intermediary media or devices. As another example, devices may be coupled in such a way that information can be passed there between, while not sharing any physical connection with one another. Based on the disclosure provided herein, one of ordinary skills in the art will appreciate a variety of ways in which connection or coupling exists in accordance with the aforementioned definition.

If the specification states a component or feature "may," "can," "could," or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

As used herein, a "surveillance system" generally refers to a system including one or more sensors coupled to a network, where the sensors are capable of gathering information related to tracking an individual. The sensors may include, but are not limited to, audio sensors, video sensors, and wireless device detection sensors. In some cases, the wireless device detection sensors include WiFi Access Points.

As used herein, a "network security appliance" or a "network security device" generally refers to a device or appliance in virtual or physical form that is operable to perform one or more security functions. Some network security devices may be implemented as general-purpose computers or servers with appropriate software operable to perform one or more security functions. Other network security devices may also include custom hardware (e.g., one or more custom Application-Specific Integrated Circuits (ASICs)). A network security device is typically associated with a particular network (e.g., a private enterprise network) on behalf of which it provides one or more security functions. The network security device may reside within the particular network that it is protecting, or network security may be provided as a service with the network security device residing in the cloud. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPsec), TLS, SSL), application control, Voice over Internet Protocol (VoIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), and DoS attack detection appliances (e.g., the FORTIDDOS family of DoS attack detection and mitigation appliances).

Various embodiments provide methods for tracking a device through a region. The methods include: receiving, by a processing resource, a device identification information from a first wireless access point at a first location, where the device identification information from the first wireless access point corresponds to a first time and the first wireless access point has a first region of coverage; receiving, by the processing resource, the device identification information from a second wireless access point at a second location, where the device identification information from the second wireless access point corresponds to a second time and the second wireless access point has a second region of coverage; receiving, by the processing resource, at least a first video from a first camera, where a field of view of the first camera includes at least a portion of the first region of coverage; and assembling, by the processing resource, a travel path of the first device identification information including the first location and the second location, and at least a portion of the first video within a time window around the first time.

In some instances of the aforementioned embodiments, a length of the time window is user programmable. In various instances of the aforementioned embodiments, the methods further include receiving, by the processing resource, at least a second video from a second camera, where a field of view of the second camera includes at least a portion of the second region of coverage. In such instances, the travel path further includes at least a portion of the second video corresponding to the second time. In some cases where the time window is a first time window and the first time is before the second time, the method further comprise replaying, by the processing resource, the travel path including simultaneously displaying the first video in a first display window on a display and the second video in a second display window on the display, where the first display window is accentuated compared with the second display window during a second time window around the first time, and the second display window is accentuated compared with the first display window during a third time window around the second time. In some cases, accentuating the first window compared with the second window includes maximizing the first window to cover the entire screen of the display.

In one or more instances of the aforementioned embodiments, the methods further include receiving, by the processing resource, at least a second video from a second camera, where a field of view of the second camera includes at least a portion of the first region of coverage. In such instances the travel path further includes at least a portion of the second video corresponding to the first time.

In various instances of the aforementioned embodiments, the methods further include associating, by the processing resource, the device identification information with an image of an individual. In some such instances where the time window is a first time window and the associating the first device identification information with the image of the individual comprises identifying, by the processing resource, the device identification information within the first region of coverage within a second time window around a time when the individual has been identified within the first video. In some instances of the aforementioned embodiments where the first location and the second location are within a security zone, the methods further include providing, by the processing resource, an alert to a monitoring system when the device identification information is within the security zone.

Other embodiments provide systems for tracking devices through a region. Such systems include: a processing resource, and a non-transitory computer-readable medium coupled to the processing resource. The non-transitory computer-readable medium has stored thereon instructions that when executed by the processing resource cause the processing resource to: receive a device identification information from a first wireless access point at a first location, where the device identification information from the first wireless access point corresponds to a first time, and the first wireless access point has a first region of coverage; receive the device identification information from a second wireless access point at a second location, where the device identification information from the second wireless access point corresponds to a second time, and the second wireless access point has a second region of coverage; receive at least a first video from a first camera, where a field of view of the first camera includes at least a portion of the first region of coverage; and assemble a travel path of the first device identification information including the first location and the second location, and at least a portion of the first video within a time window around the first time.

Yet other embodiments provide non-transitory computer-readable storage media embodying a set of instructions, which when executed by one or more processing resources of a computer system, causes the one or more processing resources to perform a method comprising: receiving a device identification information from a first wireless access point at a first location, where the device identification information from the first wireless access point corresponds to a first time, and where the first wireless access point has a first region of coverage; receiving the device identification information from a second wireless access point at a second location, where the device identification information from the second wireless access point corresponds to a second time, and where the second wireless access point has a second region of coverage; receiving at least a first video from a first camera, where a field of view of the first camera includes at least a portion of the first region of coverage; and assembling a travel path of the first device identification information including the first location and the second location, and at least a portion of the first video within a time window around the first time.

Turning to FIG. 1A, an example network environment 100 is shown including a surveillance system 102 in accordance with some embodiments. As shown, in addition to surveillance system 102, network environment 100 includes a number of cameras (e.g., a camera 120 at a location A, a camera 121 at a location B, a camera 122 at a location C, and a camera 123 at a location D), a number of wireless access points (e.g., a wireless access point 125 at a location E, a wireless access point 126 at a location F, a wireless access point 127 at a location G, and a wireless access point 128 at a location H), a storage system 112, a local monitoring system 116, and a law enforcement system 118. Surveillance system 102 includes a wireless access point recording system 104, a video recording system 106, an activity tracking system 108, and a real time synchronization clock 110. Surveillance system 102, cameras 120, 121, 122, 123, wireless access points 125, 126, 127, 128, storage system 112, local monitoring system 116, and law enforcement system 118 are all communicably coupled and accessible via a network 114.

Network 114 may be any type of communication network known in the art. Those skilled in the art will appreciate that network 114 can be a wireless network, a wired network or a combination thereof that can be implemented as one of the various types of networks, such as an Intranet, a Local Area Network (LAN), a Wide Area Network (WAN), an Internet, and the like. Further, network 114 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

Cameras 120, 121, 122, 123 may be any type of camera known in the art that is capable of delivering video or sequential frame outputs. In some embodiments, cameras 120, 121, 122, 123 may deliver high-resolution video frames (e.g., 1280×720, 1920×1080, 2560×1440, 2048×1536, 3840×2160, 4520×2540, 4096×3072 pixels, etc.) via network 114 at real time video speeds. Based upon the disclosure provided herein, one of ordinary skill in the art will recognize a variety of types of cameras that may be used in relation to different embodiments.

The video frames captured from cameras 120, 121, 122, 123 may be input into video recording system 106 of video surveillance system 102. Video recording system 106 is configured to segment each video stream received from each of the respective cameras 120, 121, 122, 123 and to associate the segment with both the physical location of the respective camera from which the video stream was received and a time stamp from real time synchronization clock 110 indicating a time when each video segment was received. In some embodiments, the video segments are each ten seconds long. Based upon the disclosure provided herein, one of ordinary skill in the art will recognize a variety of segment lengths that may be used in relation to different embodiments. The video segments associated with the location and time stamp information are referred to as augmented video segments. Video recording system 106 is further configured to store the augmented video segments to storage system 112.

Wireless access points 125, 126, 127, 128 may be any type of access device that provides for wireless connection to network 114, and that provide for passive monitoring of wireless devices operating within range of the respective wireless access point. In some embodiments, wireless access points 125, 126, 127, 128 are WiFi access point. As is known in the art, when a mobile device including active wireless network functionality passes within range of such a WiFi access point, it provides various device identification information to the Wifi access point. Such device identification information may include, but is not limited to, a media access control (MAC) address of the device. Based upon the disclosure provided herein, one of ordinary skill in the art will recognize a variety of types of wireless access points and/or device identification information that may be used in relation to different embodiments.

Wireless access points 125, 126, 127, 128 report the various device identification information to a wireless access point recording system 104 of surveillance system 102. Wireless access point recording system 104 is configured to associate the received device identification information with a physical location of the respective wireless access point from which the device identification information was received and a time stamp from real time synchronization clock 110 indicating a time when the device identification information was received. The device identification information associated with the location and time stamp information are referred to as augmented device identification information. Wireless access point recording system 104 is further configured to store the augmented device identification information to storage system 112.

Activity tracking system 108 is configured to track the movement of an individual within a security zone serviced by cameras 120-123 and wireless access devices 125-128. Such tracking may be based upon detection of a mobile device indicated by a device identification information associated with the individual and/or an image of the individual. In some embodiments, activity tracking system 108 is configured to perform the tracking processes discussed below in relation to FIGS. 2B-2C.

Figure 1B:
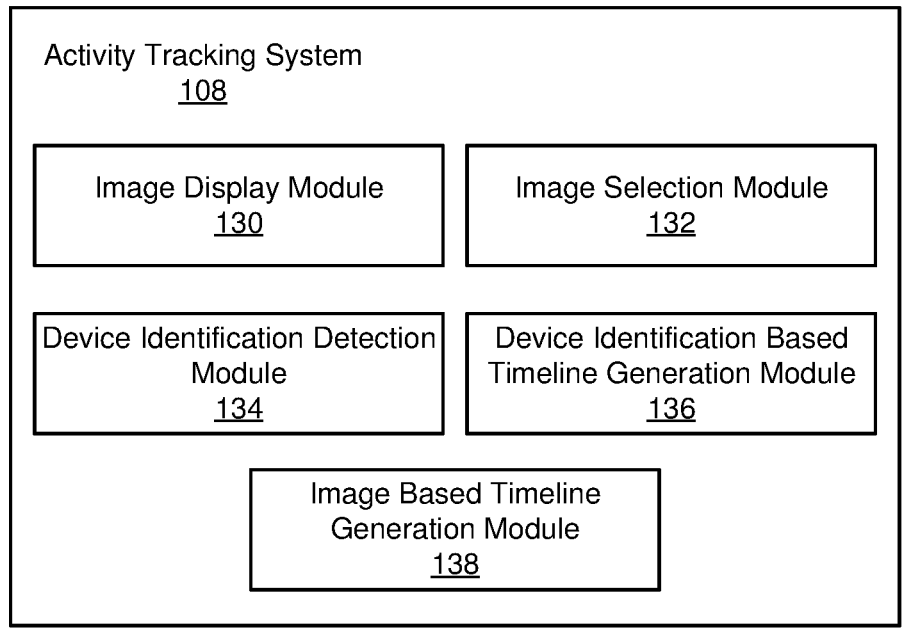

Turning to FIG. 1B, an example implementation of activity tracking system 108 is discussed in accordance with some embodiments. As shown in the example, activity tracking system 108 includes an image display module 130, an image selection module 132, a device identification detection module 134, a device identification based timeline generation module 136, and an image based timeline generation module 138.

Image display module 130 is configured to display images and/or videos. Such videos may be originally received from one or more o cameras 120-123. In some embodiments, image display module 130 is configured to display a travel path of a mobile device indicated by device identification information including multiple streams of video derived from different ones of cameras 120-123 covering security zone through which the mobile device indicated by the device identification information is traveling. In some cases, the videos are displayed on different windows of a display simultaneously with one window be accentuated compared with others when the mobile device indicated by the device identification information is passing near the camera that provided the video for the display. Such accentuation may include, but is not limited to, maximizing the window to cover the entire screen of the display. Based upon the disclosure provided herein, one of ordinary skill in the art will recognize a variety of accentuation of one window compared with another that may be used in relation to different embodiments.

Image selection module 132 is configured to select an image of an individual within a video derived from one of cameras 120-123. Device identification detection module 134 is configured to assemble a timeline of a mobile device indicated by a device identification information as it moves within a security zone.

Device identification based timeline generation module 136 is configured to generate a travel path of an individual based upon identification of a device identification information associated with the individual as that device identification information is detected by multiple wireless access devices 125-128 within a security zone. In some embodiments, device identification based timeline generation module 136 performs the processes discussed below in relation to FIG. 2C.

Image based timeline generation module 138 is configured to generate a travel path of an individual based upon identification of the individual within a video image received from one of cameras 120-123 using device identification information detected by wireless access device around the camera that provided the image where the individual was identified. In some embodiments, image based timeline generation module 138 performs the processes discussed below in relation to FIG. 2B.

Figure 1C:
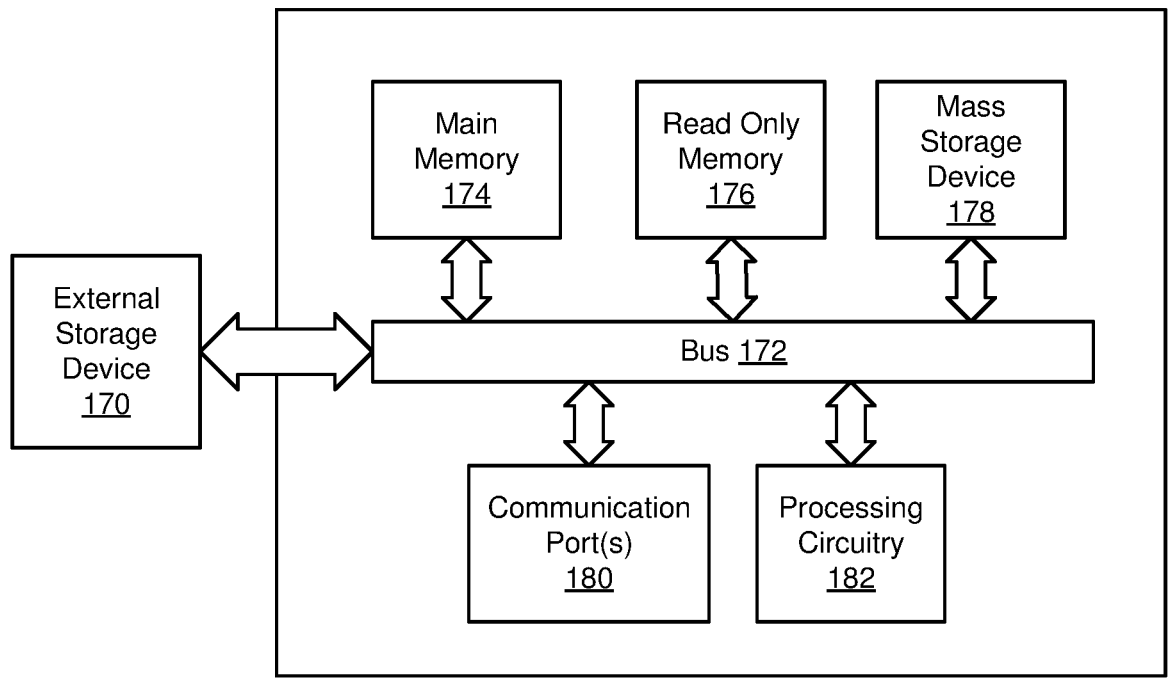

Turning to FIG. 1C, an example computer system 160 is shown in which or with which embodiments of the present disclosure may be utilized. As shown in FIG. 1C, computer system 160 includes an external storage device 170, a bus 172, a main memory 174, a read-only memory 176, a mass storage device 178, one or more communication ports 1010, and one or more processing resources (e.g., processing circuitry 182). In one embodiment, computer system 160 may represent some portion of surveillance system 102, storage system 112, local monitoring system 116, and/or law enforcement system 118.

Those skilled in the art will appreciate that computer system 160 may include more than one processing resource 182 and communication port 180. Non-limiting examples of processing resources include, but are not limited to, Intel Quad-Core, Intel i3, Intel i5, Intel i7, Apple M1, AMD Ryzen, or AMD® Opteron® or Athlon MP® processor(s), Motorola® lines of processors, FortiSOC™ system on chip processors or other future processors. Processors 182 may include various modules associated with embodiments of the present disclosure.

Communication port 180 can be any of an RS-232 port for use with a modem-based dialup connection, a 10/100 Ethernet port, a Gigabit, 10 Gigabit, 25G, 40G, and 100G port using copper or fiber, a serial port, a parallel port, or other existing or future ports. Communication port 760 may be chosen depending on a network, such as a Local Area Network (LAN), Wide Area Network (WAN), or any network to which the computer system connects.

Memory 174 can be Random Access Memory (RAM), or any other dynamic storage device commonly known in the art. Read only memory 176 can be any static storage device(s) e.g., but not limited to, a Programmable Read Only Memory (PROM) chips for storing static information e.g. start-up or BIOS instructions for the processing resource.

Mass storage 178 may be any current or future mass storage solution, which can be used to store information and/or instructions. Non-limiting examples of mass storage solutions include Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1300), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 172 communicatively couples processing resource(s) with the other memory, storage and communication blocks. Bus 172 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processing resources to software system.

Optionally, operator and administrative interfaces, e.g., a display, keyboard, and a cursor control device, may also be coupled to bus 172 to support direct operator interaction with the computer system. Other operator and administrative interfaces can be provided through network connections connected through communication port 180. External storage device 190 can be any kind of external hard-drives, floppy drives, IOMEGA® Zip Drives, Compact Disc-Read Only Memory (CD-ROM), Compact Disc-Rewritable (CD-RW), Digital Video Disk-Read Only Memory (DVD-ROM). Components described above are meant only to show various possibilities. In no way should the aforementioned example computer system limit the scope of the present disclosure.

Figure 2A:
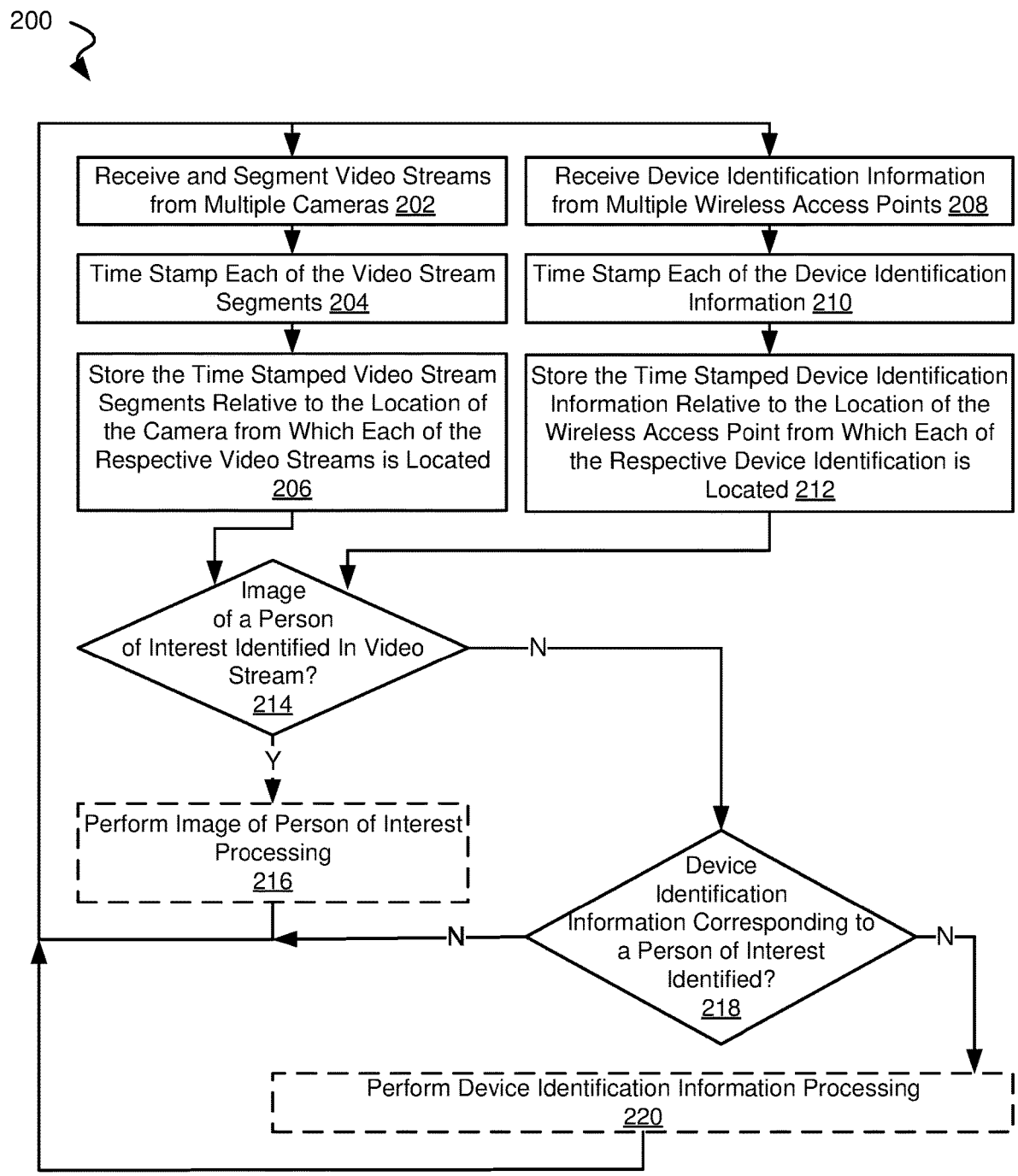
FIGS. 2A-2C are flow diagrams showing a method in accordance with some embodiments for incorporating passive wireless tracking information with video images to track activity.
Figure 2B:
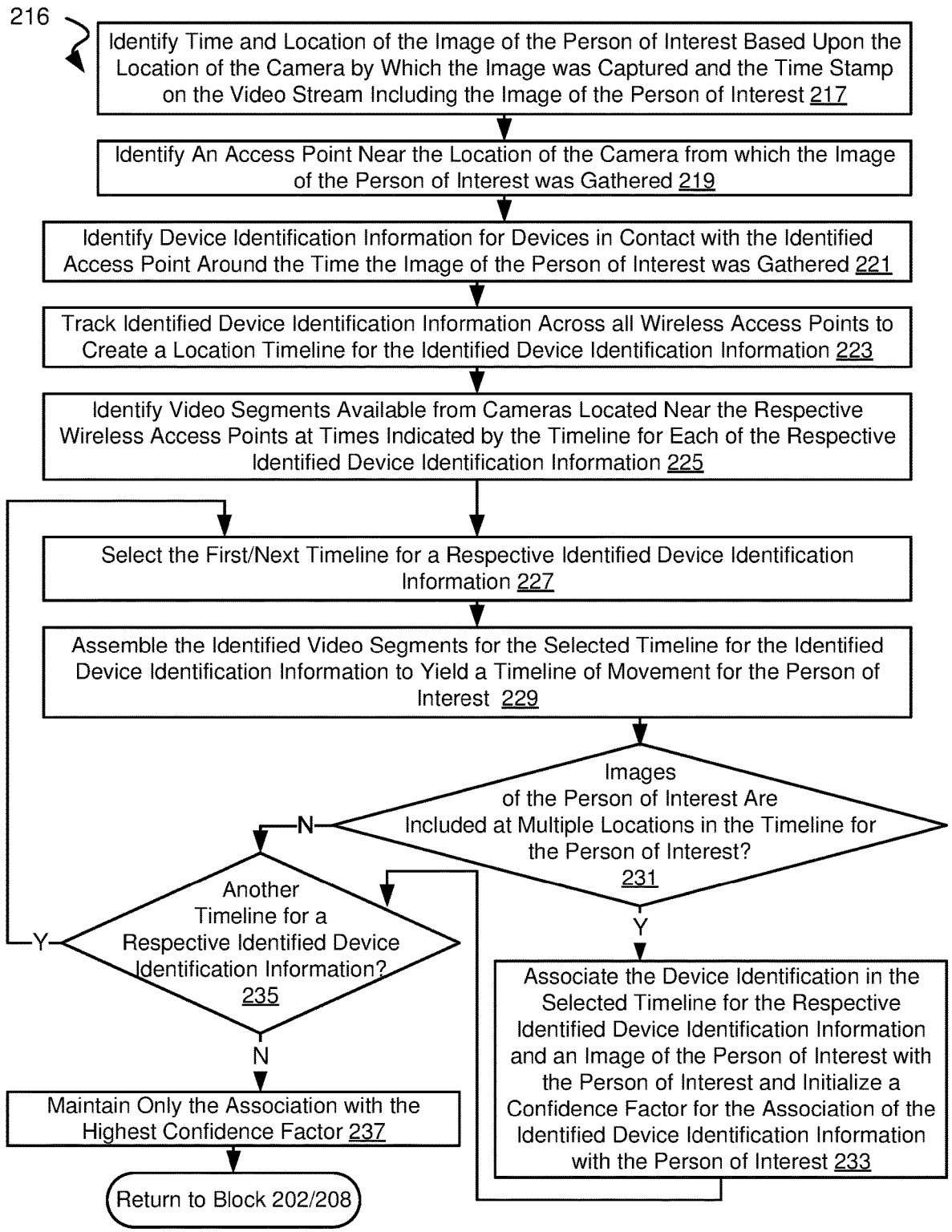
Figure 2C:
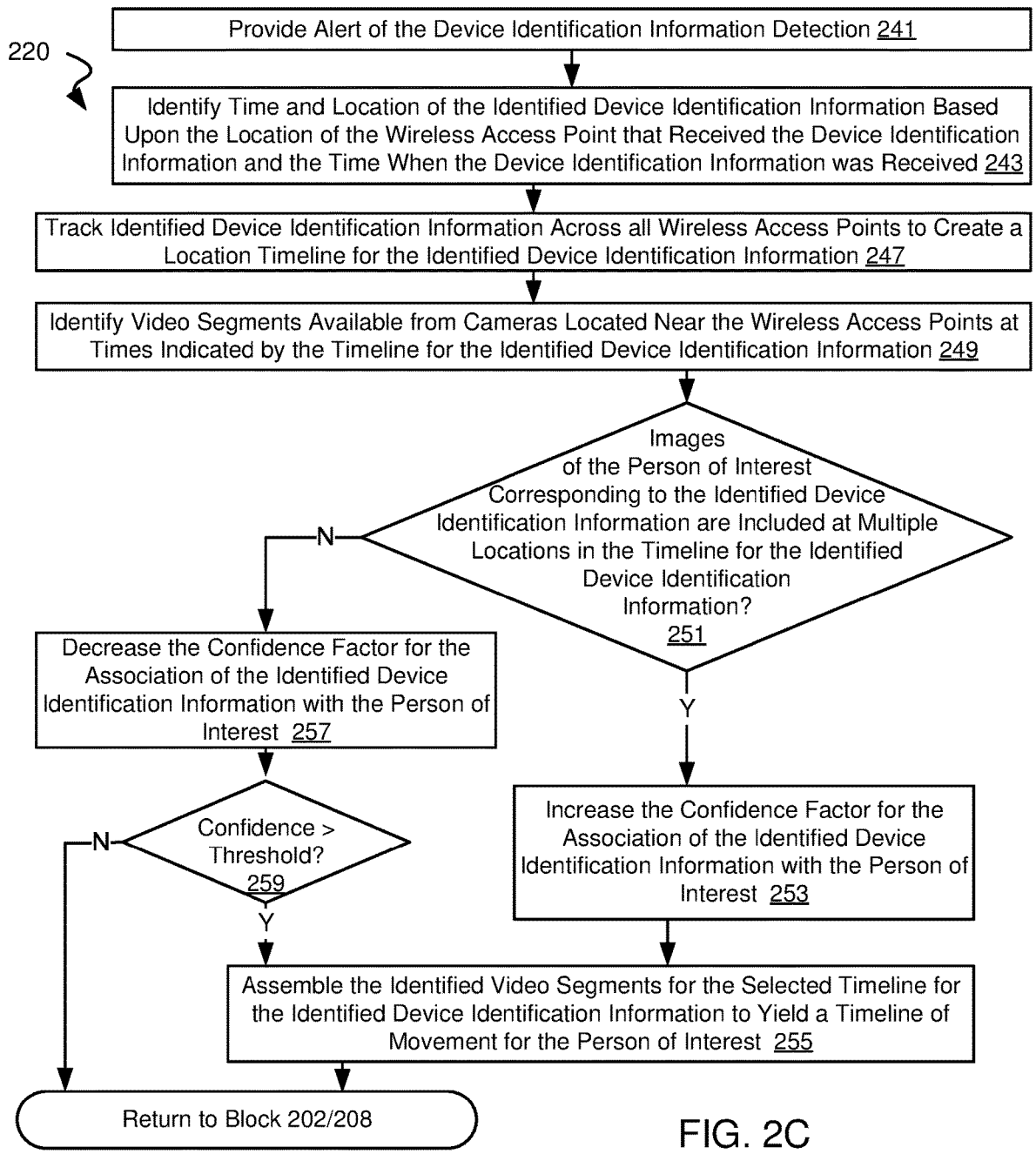

Turning to FIGS. 2A-2C, flow diagram 200 shows a method in accordance with some embodiments for incorporating passive wireless tracking information with video images to track activity. Following flow diagram 200, video streams from multiple cameras are received and segmented (block 202). Such segmenting is designed to make an otherwise continuous video stream into a number of segments of defined length. In some embodiments, each segment is twenty seconds long. Based upon the disclosure provided herein, one of ordinary skill in the art will recognize a number of segment lengths that may be used in relation to different embodiments.

A time stamp is associated with each of the video stream segments (block 204). In some embodiments, this may be done by accessing a real time synchronization clock to obtain the time when the respective video stream segment was received. In other embodiments, the camera which generates the video creates the time stamp and the received video includes the time stamp. This time stamp is then stored with the video stream segment. By using segmenting and time stamping, the continuous video streams are modified into a series of video segments that are time stamped. Such time stamps operate as bookmarks into the originally received continuous video stream.

The time stamped video stream segments are stored relative to the location of the camera from which the original continuous video stream was received (block 206). In some embodiments, the location is a latitude/longitude value that identifies the physical location of the camera. In other embodiments, the location is a description of a region of an area monitored by the camera from which the original continuous video stream was received, such as, for example, "front of store". Based upon the disclosure provided herein, one of ordinary skill in the art will appreciate a variety of location descriptions that may be associated with the received video streams.

In parallel to receiving the video streams, device identification information is received from a number of wireless access points (block 208). Such wireless access points detect wireless communication signals generated by mobile devices (e.g., cellular telephones, laptop computers, and the like) that pass within a communication range of a respective wireless access point. Such device identification information may include, but is not limited to, a media access control (MAC) address of the mobile device. Based upon the disclosure provided herein, one of ordinary skill in the art will recognize a variety of types of wireless access points and/or device identification information that may be used in relation to different embodiments.

The device identification information from each wireless access point is received and time stamped indicating when it was received (block 210). In some embodiments, the time stamp may be applied by the wireless access point. In other embodiments, this time stamping may be done by accessing a real time synchronization clock to obtain the time when the respective device identification information was received. This time is then stored with the device identification information. By using time stamping, the multitude of device identification information are each time stamped making it possible to see the movement of a respective device identification information over a period of time when it is within range of at least one wireless access point.

Each of the time stamped device identification information are stored relative to the location of the wireless access point by which they were detected (block 212). In some embodiments, the location is a latitude/longitude value that identifies the physical location of the wireless access point. In other embodiments, the location is a description of a region of an area monitored by the wireless access point from which the original device identification information was received, such as, for example, "back of store". Based upon the disclosure provided herein, one of ordinary skill in the art will appreciate a variety of location descriptions that may be associated with each of the received device identification information.

It is determined if an image of a person of interest has been identified in a video stream (block 214). In some embodiments this determination may be made by, for example, a security person monitoring the various video streams and looking for suspicious behavior. In other embodiments, this determination may be made using facial recognition software that looks for the face of persons of interest within the various video streams. Any facial recognition system known in the art may be used to perform such automated determination. In such automated situations, the facial recognition systems may be seeded with photos of persons of interest. Such persons of interest may be, for example, known offenders. Based upon the disclosure provided herein, one of ordinary skill in the art will recognize a variety of approaches for determining that an image of a person of interest is within one of the various video streams.

Where it is determined that an image of a person of interest is within any of the video streams (block 214), the processes of block 216 are performed. Block 216 is shown in dashed lines as it is represented by a flow diagram of the same number in FIG. 2B. Turning to FIG. 2B and following flow diagram 216, the time and location of the image of the person of interest is identified (block 217). The location of the person of interest is the physical location of the camera from which the image was captured, and the time is the time stamp on the video segment in which the image of the person of interest is identified.

In addition, one or more wireless access points are identified that overlap the location of the camera from which the image of the person of interest was gathered (block 219), and device identification information received from the one or more identified wireless access points within a defined time window around the time the image of the person interest was detected is/are identified (block 221).

Figure 3:
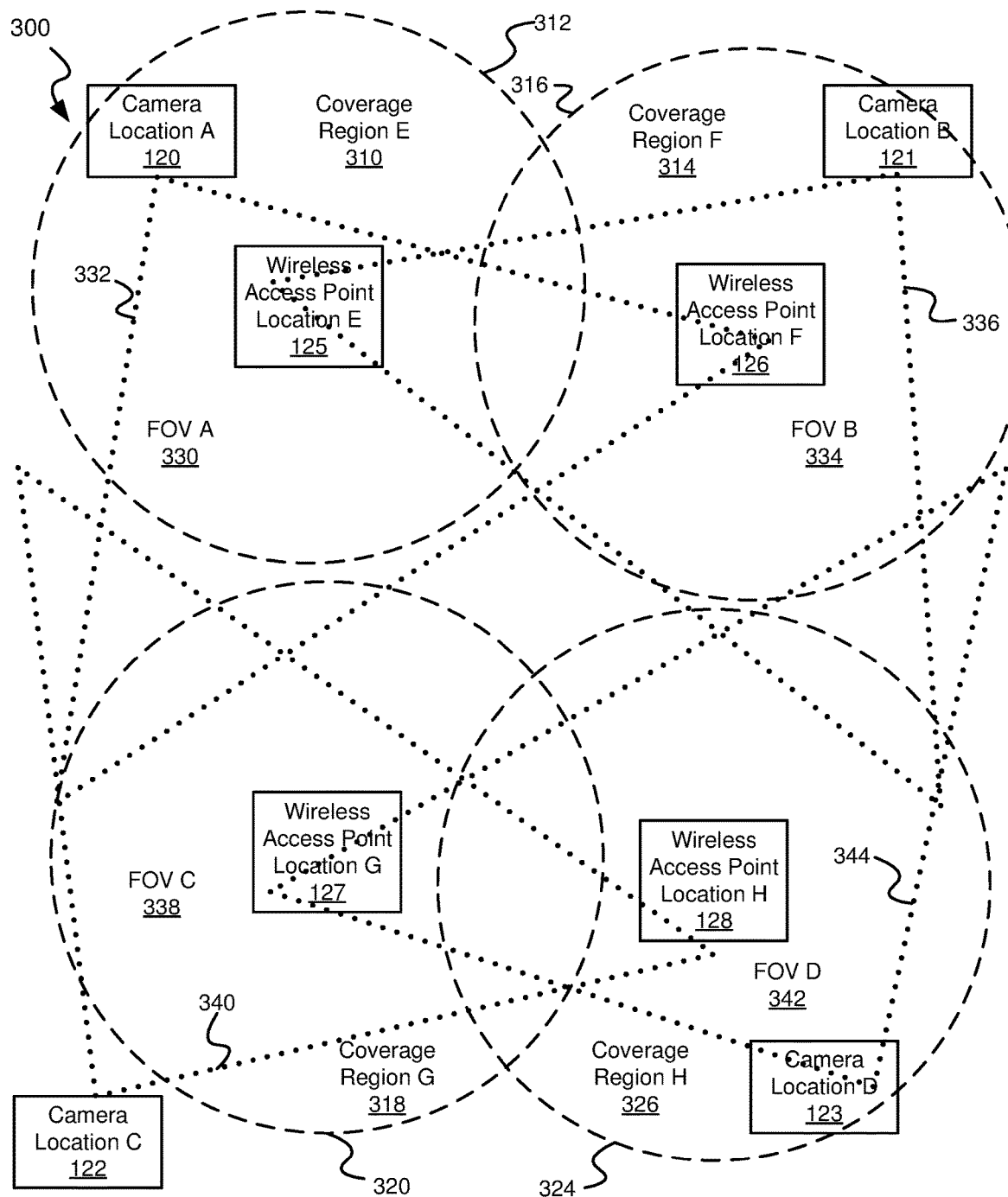
FIGS. 3-4 show example placements of wireless access points and cameras in accordance with some embodiments.

Turning to FIG. 3 a diagram 300 shows example placements of wireless access points 125-128 and cameras 120-123 in accordance with some embodiments. As shown, camera 120 at location A has a field of view A 330 indicated by a dotted triangle 332, camera 121 at location B has a field of view B 334 indicated by a dotted triangle 336, camera 122 at location C has a field of view C 338 indicated by a dotted triangle 340, and camera 123 at location D has a field of view D 342 indicated by a dotted triangle 344. Wireless access point 125 at location E has a coverage region E 310 (i.e., range of reception) indicated by a dashed line perimeter 312, wireless access point 126 at location F has a coverage region F 314 (i.e., range of reception) indicated by a dashed line perimeter 316, wireless access point 127 at location G has a coverage region G 318 (i.e., range of reception) indicated by a dashed line perimeter 320, and wireless access point 128 at location H has a coverage region H 326 (i.e., range of reception) indicated by a dashed line perimeter 324.

In the example, various fields of view 330, 334, 338, 342 overlap making it possible that a person of interest may be seen within the field of view of one or more of cameras 121-123 at the same time. Similarly, various coverage regions 310, 314, 318, 326 overlap making it possible that a mobile device carried by the person of interest may be detected within the coverage region of one or more of wireless access points 125-128 at the same time. Further, while one of the wireless access points 125-128 may be located closer to a respective one of cameras 120-123, the field of view for the camera is not coextensive with the coverage region of the wireless access point. As such, there will be times when a person of interest may be in the field of view of a particular camera, but not within the coverage region of the most closely placed wireless access point, and vice versa. Further anomalies are possible because the cameras and wireless access points are not necessarily located at the same location, there is overlap with other cameras and wireless access points, and coverage regions and fields of view are not exactly coextensive with each other.

Returning to FIG. 2B and using the example placement of FIG. 3, where an image of a person of interest is found in a video segment provided by camera 120 at location A and a time to, identifying device identification information received from the one or more identified wireless access points (block 221) would involve identifying device identification information received by any wireless access point with a coverage region within field of view A 330 and within a time window (e.g., $t_{-2}$ to $t_{+2}$). As shown in FIG. 3, this would include all device identification information detected within the time window from wireless access point 125, wireless access point 126, and wireless access point 127. The following Table shows the location of various mobile devices A-H associated with device identification information that are detected by wireless access points 125-128 within the time window.

| Time | Wireless Access Point 125 | Wireless Access Point 126 | Wireless Access Point 127 | Wireless Access Point 128 | FOV A 330 | FOV B 334 | FOV C 338 | FOV D 342 |
|---|---|---|---|---|---|---|---|---|
| $t_2$ | | G | A | | | | | |
| $t_1$ | A, B | G | | | | | | |
| $t_0$ | A, B | G, B, C | E | | H, D | POI | | |
| $t_{+1}$ | A, B, C, G | G, B, D | | | H, E | | | |
| $t_{+2}$ | B, D | | F | | B, C, G, H | | | |

As shown in the table, mobile devices A, B, C, D, E, F, and G are detected by at least one of wireless access point 125, wireless access point 126, and/or wireless access point 127 during the time window. Further, the person of interest (abbreviated POI in the table) is detected at least within the field of view 330 at time to.

The various device identification information corresponding to mobile devices A, B, C, D, E, F, and G is then tracked across a larger window of time (e.g., $t_{-4}$ to $t_{+4}$) to form the a location timeline for the identified device identification information (block 223). Again, using the example of FIG. 3 that was started above, the previous table is expanded into the following table and may now include more identified mobile devices because of the extended time range, but these additional mobile devices are not included as they were not identified in block 223.

| Time | Wireless Access Point 125 | Wireless Access Point 126 | Wireless Access Point 127 | Wireless Access Point 128 | FOV A 330 | FOV B 334 | FOV C 338 | FOV D 342 |
|---|---|---|---|---|---|---|---|---|
| $t_{-4}$ | | | | | B, E, G | | | |
| $t_{-3}$ | | | A | | B, D, E, G | | | |
| $t_{-2}$ | | G | A, B | | | | | |
| $t_{-1}$ | A, B | G | | | | | | |
| $t_0$ | A, B | G, B, C | E | | H, D | POI | | |
| $t_{+1}$ | A, B, C, G | G, B, D | | | H, E | | | |
| $t_{+2}$ | B, D | | F | | B, C, G, H | | | |
| $t_3$ | D | | F | | C, G | | | |
| $t_4$ | D | | F | | | | | |

Using this table, a timeline for each of mobile devices A, B, C, D, E, F, and G is formed for the larger window of time. In some cases, like the example shown in FIG. 4, one or more time points (e.g., $t_{-4}$ to $t_{+4}$) may not be known because the mobile device associated with the device information was not within a coverage region (e.g., coverage region E 410, coverage region F 414, coverage region G 418, or coverage region H 426) at a given time point along the window of time. In such circumstances, location extrapolation may be used to estimate the location of the mobile device associated with the device information when it is out of range. This estimated location information may be used to augment the aforementioned timelines for each of mobile devices A, B, C, D, E, F, and G. In some embodiments, the location extrapolation may be done similar to that discussed below in relation to FIG. 6.

Video segments that include a field of view covering at least a portion of a coverage region of one of the identified wireless access points considered in block 221 are assembled into a video timeline extending across the larger window of time are identified (block 225). Using the example of FIG. 3 where wireless access points 125, 126, 127 were considered in block 221, all video segments including a field of view covering at least a portion of a coverage region served by one of wireless access points 125, 126, 127 are identified. In this case, video segments corresponding to field of view 330 (camera 120), field of view 334 (camera 121), field of view 338 (camera 122), and field of view 342 (camera 123) would be identified.

A first of the timelines for the identified device identification information (e.g., one of the timeline for mobile device A, the timeline for mobile device B, the timeline for mobile device C, the timeline for mobile device D, the timeline for mobile device E, the timeline for mobile device F, and the timeline for mobile device G) that was prepared in block 223 is selected (block 227). Video segments identified in block 225 are assembled for the timeline for the mobile device selected in block 227 (block 229). Again, using the example of FIG. 3 that was started above and assuming the timeline for mobile device A was selected in block 227, video segments from camera 120 (i.e., FOV A 330) are assembled for the time window $t_{-3}$ to $t_{+1}$ (i.e., the time window where mobile device A was detected by at least one of the wireless access points 125, 126, 127, 128) are assembled; video segments from camera 121 (i.e., FOV B 334) are assembled for the same time window; video segments from camera 122 (i.e., FOV C 338) are assembled for the same time window; and video segments from camera 123 (i.e., FOV D 342) are assembled for the same time window. These assembled video segments is augmented to identify the wireless access point locations and corresponding time periods for the selected mobile device to form a timeline of movement for the person of interest.

For comparison purposes, if mobile device B had been selected in block 227, the time window for the respective video segments would be from $t_{-4}$ to $t_{+2}$ (i.e., the time window where mobile device B was detected by at least one of the wireless access points 125, 126, 127, 128); if mobile device C had been selected in block 227, the time window for the respective video segments would be from $t_0$ to $t_{+3}$ (i.e., the time window where mobile device C was detected by at least one of the wireless access points 125, 126, 127, 128); if mobile device D had been selected in block 227, the time window for the respective video segments would be from $t_{-3}$ to $t_{+4}$ (i.e., the time window where mobile device D was detected by at least one of the wireless access points 125, 126, 127, 128); if mobile device E had been selected in block 227, the time window for the respective video segments would be from $t_{-4}$ to $t_{+1}$ (i.e., the time window where mobile device E was detected by at least one of the wireless access points 125, 126, 127, 128); if mobile device F had been selected in block 227, the time window for the respective video segments would be from $t_{+2}$ to $t_{+3}$ (i.e., the time window where mobile device F was detected by at least one of the wireless access points 125, 126, 127, 128); or if mobile device G had been selected in block 227, the time window for the respective video segments would be from $t_{-4}$ to $t_{+3}$ (i.e., the time window where mobile device G was detected by at least one of the wireless access points 125, 126, 127, 128).

The timeline of movement for the person of interest for the mobile device selected in block 227 are reviewed to determine whether the person of interest appears in any video segments at multiple locations (i.e., multiple wireless access point locations) across the time period (block 231). In some embodiments this determination may be made by, for example, a security person watching the timeline of movement of the person of interest assembled based upon the selected mobile device. In other embodiments, this determination may be made using facial recognition software that looks for the face of persons of interest within the timeline of movement of the person of interest assembled based upon the selected mobile device. Based upon the disclosure provided herein, one of ordinary skill in the art will recognize a variety of approaches for determining the number of locations that the person of interest appears across the timeline of the person of interest.

Where the person of interest appears in multiple locations across the time period of the timeline of movement for the person of interest (block 231), the device identification information for the mobile device selected in block 227 and the image of the person of interest are associated with each other and a confidence factor for the association is initialized (block 233). The association is stored to a database for future use. The confidence factor may be a function of how many different locations (i.e., wireless access point locations) both the mobile device and the person of interest are identified at the same time across the aforementioned timeline of movement for the person of interest and a total percentage of time that both the person of interest and the selected mobile device are included across the timeline of movement for the person of interest. The larger the number of locations and overall time period, the higher the confidence factor. In some embodiments this determination may be made by, for example, a security person watching the timeline of movement of the person of interest. In other embodiments, this determination may be made using facial recognition software that looks for the face of persons of interest within the timeline of movement of the person of interest along with the location information. Based upon the disclosure provided herein, one of ordinary skill in the art will recognize a variety of approaches for determining the number of locations that the person of interest and the mobile device are detected across the timeline of the person of interest.

To aid in understanding, the following table is augmented to include the person of interest (abbreviated POI) to the example table above as the person of interest travels across the various fields of view and coverage regions. This information is used to form the timeline of movement for the person of interest

| Time | Wireless Access Point 125 | Wireless Access Point 126 | Wireless Access Point 127 | Wireless Access Point 128 | FOV A 330 | FOV B 334 | FOV C 338 | FOV D 342 |
|---|---|---|---|---|---|---|---|---|
| $t_{-4}$ | | | | | B, E, G | | | |
| $t_{-3}$ | | | A | | B, D, E, G | | POI | |
| $t_{-2}$ | | G | A, B | | | | | |
| $t_{-1}$ | A, B | G | | | | | POI | |
| $t_0$ | A, B | G, B, C | E | | H, D | | POI | |
| $t_{+1}$ | A, B, C, G | G, B, D | | | H, E | | POI | |
| $t_{+2}$ | B, D | | F | | B, C, G, H | | | |
| $t_3$ | D | | F | | C, G | | | |
| $t_4$ | D | | F | | | | | |

In this case, the timeline of movement for the person of interest for mobile device A would extend across four segments (time $t_3$ to $t_{+1}$) with the person of interest and the selected mobile device (i.e., mobile device A) being identified together in three of the four time segments, and mobile device being identified at two different locations. In one case, the confidence factor may be calculated as the ratio of time segments that both the mobile device and the person of interest are detected to the total number of time segments in the timeline of movement for the person of interest (in this example ¾) multiplied by the number of different locations (in this example 2—coverage region E and coverage region E) that the mobile device appears during the overall time period (time $t_{-3}$ to $t_{+1}$) for a total of 1.5. Based upon the disclosure provided herein, one of ordinary skill in the art will recognize a variety of algorithms that may be used to calculate the confidence factor.

The processes of blocks 227-233 are repeated for each of the mobile devices identified in block 221 (block 235). Once all of the mobile devices identified in block 221 have been considered (block 235), which of the mobile devices resulted in the highest confidence factor (block 237), and only that association is maintained in a storage memory. The association, as more fully described below in relation to FIG. 2C) may be used in detecting when an assumed person of interest has entered a secured area based upon the presence of the mobile device associated with the person of interest being detected by one of the wireless access points covering the secured area. In addition, the timeline of the person of interest may be used as evidence for any prosecution of the person of interest and for purposes of determining any other suspicious activity by the person of interest beyond that already observed.

Figure 4:
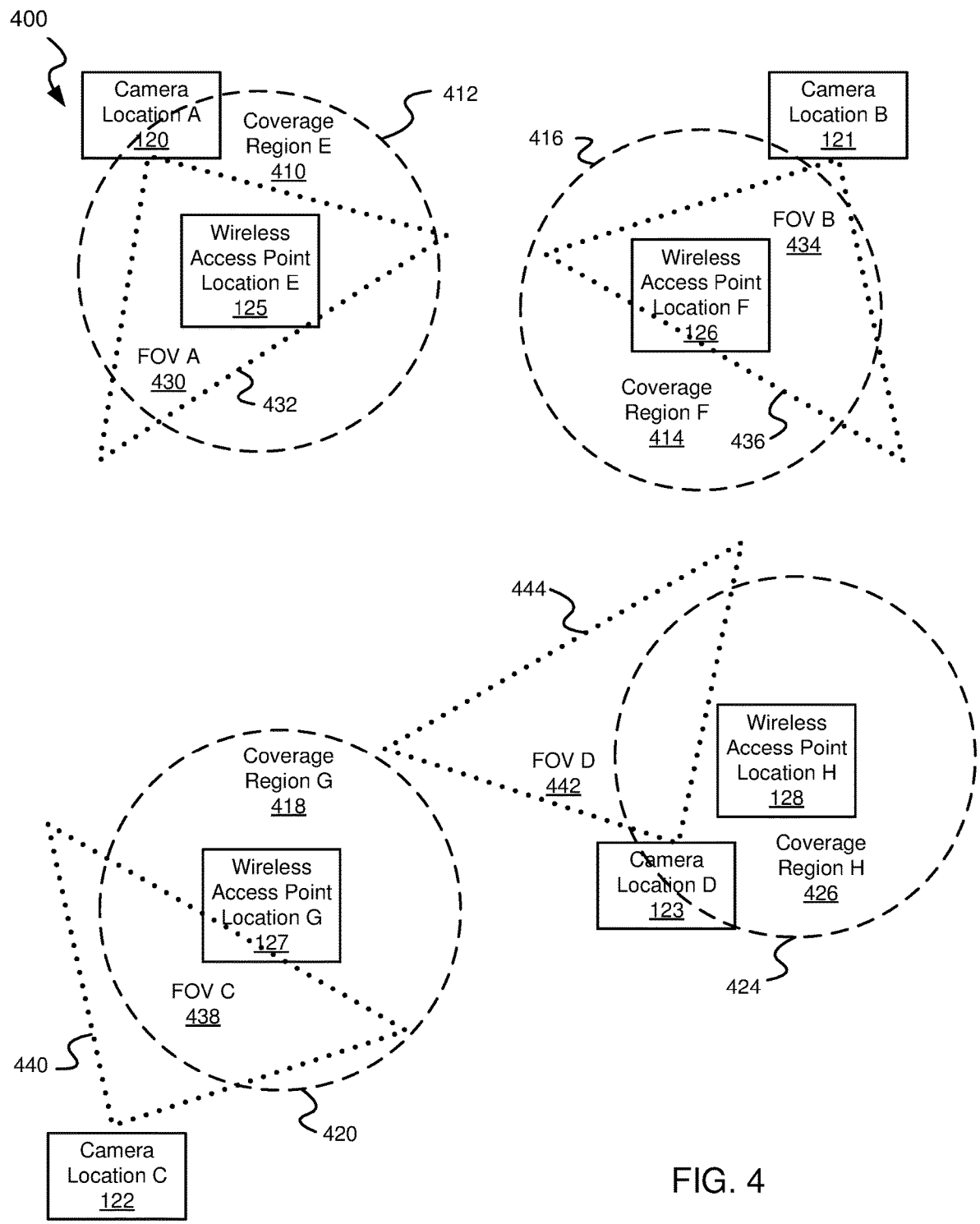

To provide additional understanding, the processes of blocks 217-237 of FIG. 2B are re-described using a diagram 400 of example placements of wireless access points 125-128 and cameras 120-123 shown in FIG. 4. Turning to FIG. 4, camera 120 at location A has a field of view A 430 indicated by a dotted triangle 432, camera 121 at location B has a field of view B 434 indicated by a dotted triangle 436, camera 122 at location C has a field of view C 438 indicated by a dotted triangle 440, and camera 123 at location D has a field of view D 442 indicated by a dotted triangle 444. Wireless access point 125 at location E has a coverage region E 410 (i.e., range of reception) indicated by a dashed line perimeter 412, wireless access point 126 at location F has a coverage region F 414 (i.e., range of reception) indicated by a dashed line perimeter 416, wireless access point 127 at location G has a coverage region G 418 (i.e., range of reception) indicated by a dashed line perimeter 420, and wireless access point 128 at location H has a coverage region H 426 (i.e., range of reception) indicated by a dashed line perimeter 424.

In contrast to that shown in the example of FIG. 3, neither the various fields of view 430, 434, 438, 442 nor the various coverage regions 410, 414, 418, 426 overlap. Thus, while the placements of FIG. 3 offer enhanced coverage and therefore ability to track, the placements of FIG. 4 reduce processing complexity as will be appreciated from the following discussion.

Returning to FIG. 2B and using the example placement of FIG. 4, where an image of a person of interest is found in a video segment provided by camera 120 at location A and a time to, identifying device identification information received from the one or more identified wireless access points (block 221) would involve identifying device identification information received by any wireless access point with a coverage region within field of view A 430 and within a time window (e.g., $t_{-2}$ to $t_{+2}$). As shown in FIG. 4, this would include only device identification information detected within the time window from wireless access point 125. The following Table shows the location of various mobile devices A-D associated with device identification information that are detected by wireless access point 125 within the time window.

| Time | Wireless Access Point 125 | Wireless Access Point 126 | Wireless Access Point 127 | Wireless Access Point 128 | FOV A 430 | FOV B 434 | FOV C 438 | FOV D 442 |
|---|---|---|---|---|---|---|---|---|
| $t_{-2}$ | | A | D | | | | | |
| $t_{-1}$ | A, B | | D | | | | | |
| $t_0$ | A, B | | | | | | POI | |
| $t_{+1}$ | A, C | D, B | | | | | | |
| $t_{+2}$ | C | | A | | B | | | |

As shown in the table, mobile devices A, B, and C are detected by wireless access point 125 during the time window. Further, the person of interest (abbreviated POI in the table) is detected at least within the field of view 430 at time to.

The various device identification information corresponding to mobile devices A, B, and C is then tracked across a larger window of time (e.g., $t_{-4}$ to $t_{+4}$) to form a location timeline for the identified device identification information (block 223). Again, using the example of FIG. 4 that was started above, the previous table is expanded into the following table and may now include more identified mobile devices because of the extended time range, but these additional mobile devices are not included as they were not identified in block 223.

| Time | Wireless Access Point 125 | Wireless Access Point 126 | Wireless Access Point 127 | Wireless Access Point 128 | FOV A 430 | FOV B 434 | FOV C 438 | FOV D 442 |
|---|---|---|---|---|---|---|---|---|
| $t_{-4}$ | | | | | A | | | |
| $t_{-3}$ | | | | | | | | |
| $t_{-2}$ | | A | D | | | | | |
| $t_{-1}$ | A, B | | D | | | | | |
| $t_0$ | A, B | | | | | | POI | |
| $t_{+1}$ | A, C | B, D | | | | | | |
| $t_{+2}$ | C | | A | | B | | | |
| $t_{+3}$ | | | | | | B, C | | |
| $t_{+4}$ | | | | | C | | | |

Using this table, a timeline for each of mobile devices A, B, C, and is formed for the larger window of time.

Video segments that include a field of view covering at least a portion of a coverage region of one of the identified wireless access points considered in block 221 are assembled into a video timeline extending across the larger window of time are identified (block 225). Using the example of FIG. 4 where wireless access point 125 was considered in block 221, all video segments including a field of view covering at least a portion of coverage region E 410 is identified. In this case, video segments corresponding to field of view 430 (camera 120) would be identified.

A first of the timelines for the identified device identification information (e.g., one of the timeline for mobile device A, the timeline for mobile device B, or the timeline for mobile device C) that was prepared in block 223 is selected (block 227). Video segments identified in block 225 are assembled for the timeline for the mobile device selected in block 227 (block 229). Again, using the example of FIG. 4 that was started above and assuming the timeline for mobile device A was selected in block 227, video segments from camera 120 (i.e., FOV A 430) are assembled for the time window $t_{-4}$ to $t_{+2}$ (i.e., the time window where mobile device B was detected by at least one of the wireless access points 125, 126, 127, 128) are assembled. These assembled video segments are augmented to identify the wireless access point locations and corresponding time periods for the selected mobile device to form a timeline of movement for the person of interest.

For comparison purposes, if mobile device B had been selected in block 227, the time window for the respective video segments would be from $t_{-1}$ to $t_{+3}$ (i.e., the time window where mobile device B was detected by at least one of the wireless access points 125, 126, 127, 128); or if mobile device C had been selected in block 227, the time window for the respective video segments would be from $t_{+1}$ to $t_{+3}$ (i.e., the time window where mobile device C was detected by at least one of the wireless access points 125, 126, 127, 128)

The timeline of movement for the person of interest for the mobile device selected in block 227 are reviewed to determine whether the person of interest appears in any video segments at multiple locations (i.e., multiple wireless access point locations) across the time period (block 231). Where the person of interest appears in multiple locations across the time period of the timeline of movement for the person of interest (block 231), the device identification information for the mobile device selected in block 227 and the image of the person of interest are associated with each other and a confidence factor for the association is initialized (block 233). The association is stored to a database for future use.

To aid in understanding, the following table is augmented to include the person of interest (abbreviated POI) to the example table above as the person of interest travels across the various fields of view and coverage regions. This information is used to form the timeline of movement for the person of interest.

| Time | Wireless Access Point 125 | Wireless Access Point 126 | Wireless Access Point 127 | Wireless Access Point 128 | FOV A 430 | FOV B 434 | FOV C 438 | FOV D 442 |
|---|---|---|---|---|---|---|---|---|
| $t_{-4}$ | | | | | A | | | POI |
| $t_{-3}$ | | | | | | | | |
| $t_{-2}$ | | A | | D | | | | |
| $t_{-1}$ | A, B | | | D | | POI | | |
| $t_0$ | A, B | | | | | POI | | |
| $t_{+1}$ | A, C | B, D | | | | | | |
| $t_{+2}$ | C | | | | A | B | | POI |
| $t_{+3}$ | | | | | | B, C | | POI |
| $t_{+4}$ | | | | | | C | | |

In this case, the timeline of movement for the person of interest for mobile device A would extend across six segments (time $t_{-43}$ to $t_{+2}$) with the person of interest and the selected mobile device (i.e., mobile device A) being identified together in four of the six time segments, and mobile device being identified at four different locations.

The processes of blocks 227-233 are repeated for each of the mobile devices identified in block 221 (block 235). Once all of the mobile devices identified in block 221 have been considered (block 235), which of the mobile devices resulted in the highest confidence factor (block 237), and only that association is maintained in a storage memory. The association, as more fully described below in relation to FIG. 2C may be used in detecting when an assumed person of interest has entered a secured area based upon the presence of the mobile device associated with the person of interest being detected by one of the wireless access points covering the secured area. In addition, the timeline of the person of interest may be used as evidence for any prosecution of the person of interest and for purposes of determining any other suspicious activity by the person of interest beyond that already observed.

Returning to FIG. 2A, where it is determined that an image of a person of interest is not within any of the video streams (block 214), it is determined whether a device identification information corresponding to a person of interest has been received by a wireless access point (block 218). Such a determination may be made by, for example, comparing device identification information received from the various wireless access points with a list of previously categorized device identification information. Each instance of categorized device identification information is associated with an image of a presumed owner/user of the device identified by the device identification information. In addition, a confidence factor is maintained in relation to each instance of categorized device identification information representing a likelihood that the categorization of the device identification information as owned/used by the particular person indicated as the owner/user of the device is correct.

Where it is determined that a device identification information corresponding to a person of interest has been received by a wireless access point (block 218), the processes of block 220 are performed. Block 220 is shown in dashed lines as it is represented by a flow diagram of the same number in FIG. 2C. Turning to FIG. 2C and following flow diagram 220, an alert is provided indicating that a previously identified device identification information was detected by one of the wireless access points (block 241). This alert may be provided, for example, to a monitoring system operated by security personnel. The time and location of the identified device identification information is identified (block 243). The location of the identified device identification information is the physical location of the wireless access point from which the device identification information was received, and the time is the time stamp on the device identification information.

In addition, the identified device identification information is tracked through time across all wireless access points to create a location timeline for the identified device identification information (block 247). Using the example placement of FIG. 3, where the identified device identification information was received from wireless access point 125 at a time to, the following Table shows the location of various mobile devices identified as A-H associated with device identification information that are detected by wireless access points 125-128 within a time window (e.g., $t_{-4}$ to $t_{+4}$).

| Time | Wireless Access Point 125 | Wireless Access Point 126 | Wireless Access Point 127 | Wireless Access Point 128 | FOV A 330 | FOV B 334 | FOV C 338 | FOV D 342 |
|---|---|---|---|---|---|---|---|---|
| $t_{-4}$ | | | | | | B, E, G | | |
| $t_{-3}$ | | | A | | | B, D, E, G | | |
| $t_{-2}$ | | G | A, B | | | | | |
| $t_{-1}$ | A, B | G | | | | | | |
| $t_0$ | A, B | G, B, C | E | H, D | | | | |
| $t_{+1}$ | A, B, C, G | G, B, D | | H, E | | | | |
| $t_{+2}$ | B, D | | F | | | B, C, G, H | | |
| $t_{+3}$ | D | | F | | | | C, G | |
| $t_{+4}$ | D | | F | | | | | |

Where the identified device identification information from block 243 corresponds to mobile device A, from the preceding table the device may be tracked as it enters the secured area at the location of wireless access point 127 (time $t_{-4}$ to $t_{-3}$), to where it travels from the location of wireless access point 127 to the location of wireless access point 125 (time $t_{-3}$ to $t_{-1}$), and until it leaves the secured area (time $t_{-1}$ to $t_{+2}$). This tracking constitutes the timeline for the identified device identification information.

Again, in some cases like the example shown in FIG. 4, one or more time points (e.g., $t_{-4}$ to $t_{+4}$) may not be known because the mobile device associated with the device information was not within a coverage region (e.g., coverage region E 410, coverage region F 414, coverage region G 418, or coverage region H 426) at a given time point along the window of time. In such circumstances, location extrapolation may be used to estimate the location of the mobile device associated with the device information when it is out of range. This estimated location information may be used to augment the aforementioned timelines for each of mobile devices A, B, C, D, E, F, and G. In some embodiments, the location extrapolation may be done similar to that discussed below in relation to FIG. 6.

Video segments corresponding to the timeline for the identified device identification information and having a field of view at least partially intersecting a coverage region of one of the wireless access points along the timeline for the identified device identification information are identified and accessed (block 249). Continuing with the example of FIG. 3 and the timeline for mobile device A extending from time $t_{-4}$ to $t_{+2}$, video segments from camera 122 (FOVC 338) and camera 123 (FOV D 342) for the time period from time $t_{-4}$ to $t_{-1}$ are accessed, and video segments from camera 120 (FOVC 330) and camera 122 (FOV C 338) for the time period from time $t_{-2}$ to $t_{+2}$ are accessed. These accessed video segments are assembled into respective continuous video streams for each of the cameras. In this example, a first video stream for camera 120 would cover times $t_{-2}$ to $t_{+2}$, a second video stream for camera 122 would cover times $t_{-4}$ to $t_{+2}$, and a third video stream for camera 123 would cover times $t_{-4}$ to $t_{-1}$.

An image of the person of interest previously associated with the device identification information (see FIG. 2B) is compared with the assembled video segments that correspond with the timeline for the identified device identification information (block 251). In some embodiments this comparison may be made by, for example, a security person watching the assembled video streams to look for the person of interest previously associated with the identified device identification information. In other embodiments, this determination may be made using facial recognition software that looks for the face of the previously identified person of interest in the videos representing the timeline for the identified device identification. Based upon the disclosure provided herein, one of ordinary skill in the art will recognize a variety of approaches for comparing an image of person of interest with various video streams.

The comparison of the image of the person of interest with the video stream includes determining whether movement of the person of interest (i.e., the person previously associated with the identified device identification information) follows the timeline for the identified device identification. Where the movement of the person of interest follows the timeline for the identified device identification (block 251), the confidence factor for the association between the person of interest and the identified device identification information is increased (block 253). The assembled video segments for the timeline for the identified device identification information are reported (block 255). These may be reported, for example, to a monitoring system or a law enforcement system.

Alternatively, where the movement of the person of interest does not follow the timeline for the identified device identification (block 251), the confidence factor for the association between the person of interest and the identified device identification information is decreased (block 257). It is determined whether the confidence factor remains above a threshold value (block 259). This threshold value may be user programmable and is defined at a level sufficiently high to avoid reporting of information for which there is only a low confidence of accuracy. Where the confidence factor exceeds the threshold value (block 259), the assembled video segments for the timeline for the identified device identification information are reported (block 255). Again, these may be reported, for example, to a monitoring system or a law enforcement system.

Turning to FIG. 5, a flow diagram 500 showing a method in accordance with some embodiments for tracking a device identification information and incorporating video into a travel path. Following flow diagram 500, a device identification information is received by a processing resource from a first wireless access point at a first location (block 502). The device identification information from the first wireless access point corresponds to a first time, and the first wireless access point has a first region of coverage. A device identification information is received by the processing resource from a second wireless access point at a second location (block 504). The device identification information from the second wireless access point corresponds to a second time, and the second wireless access point has a second region of coverage. At least a first video from a first camera is received by the processing resource (block 506). A field of view of the first camera includes at least a portion of the first region of coverage. At least a second video from a second camera is received by the processing resource (block 508). A field of view of the second camera includes at least a portion of the second region of coverage. The processing resource assembles a travel path of the first device identification information including the first location and the second location (block 510). The travel path is augmented to include: at least a portion of the first video within a first time window around the first time, and at least a portion of the second video within the first time window around the second time.

Figure 6:
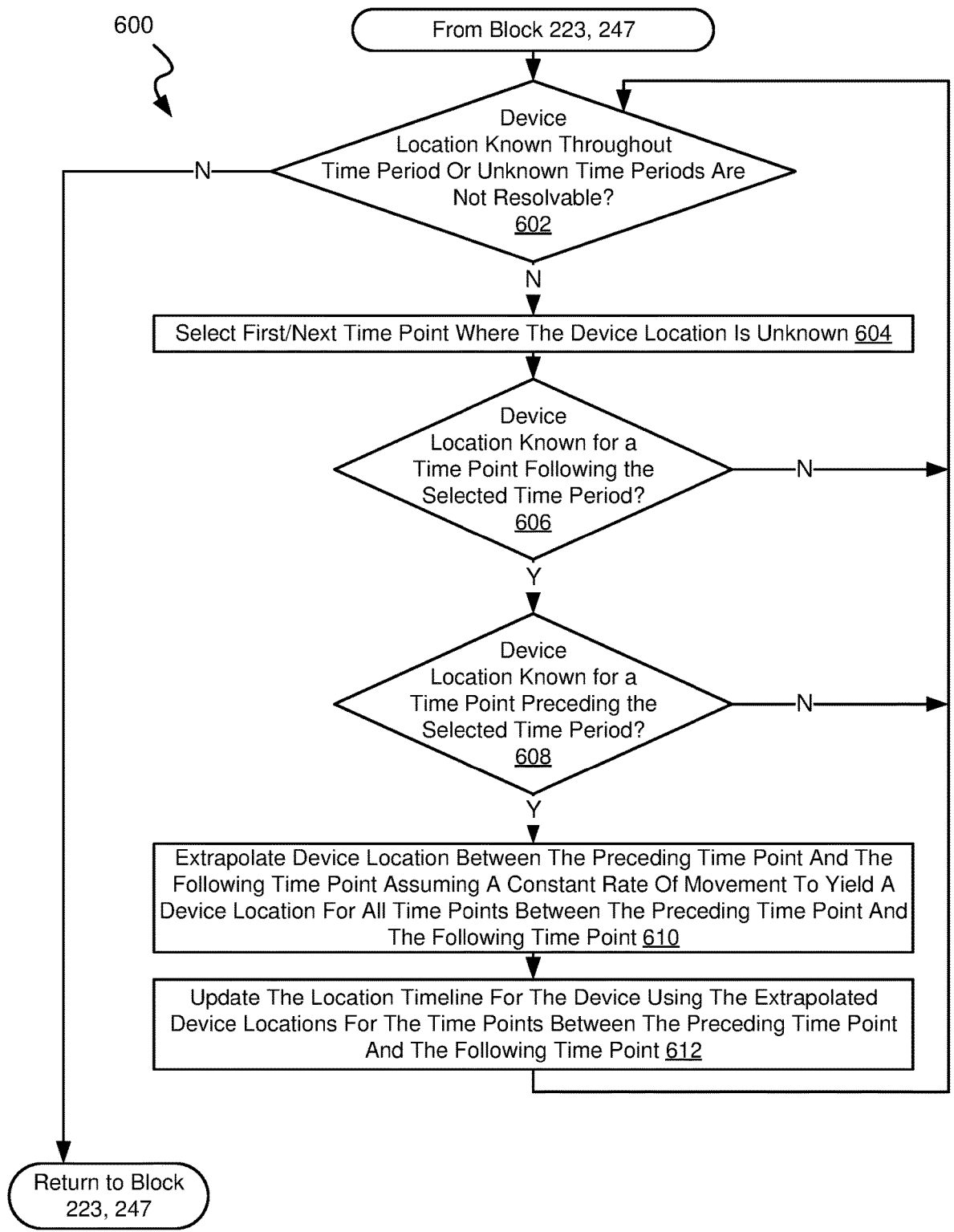
FIG. 6 shows an example of device location extrapolation that may be used in relation with some embodiments.

Turning to FIG. 6, a flow diagram 600 shows a method of device location extrapolation that may be used in relation with some embodiments. Following flow diagram 600, it is determined whether the device location corresponding to device information is known at all time points along a location timeline (block 602). For example, a time period of $t_{-4}$ to $t_{+4}$ may be relevant. In such a case, it is determined whether the device location is known for all of time points $t_{-4}, t_{-3}, t_{-2}, t_{-1}, t_0, t_{+1}, t_{+2}, t_{+3}$, and $t_{+4}$. Where none of the time points are missing or a missing time point is not resolvable (i.e., the location of the device is not known either before or after the missing time point such as when the device first enters a location under surveillance or when the device last leaves the location under surveillance, the processing is complete and no additional changes are made to the location timeline for the device.

Alternatively, where any of the time points are missing (block 602), the first/next of the missing time points is selected (bock 604). It is determined whether the location of the device is known in a time period preceding (block 606) and a time period following the selected time point (block 608). The time period preceding the selected time point may be several time points before and/or the time period following may be several time points after. Thus, for example, where time point $t_{+1}$ is selected as missing, the time period preceding may be any of $t_{+1-x}$, where x is some value greater than zero and less than a defined maximum. Similarly, where time point $t_{+1}$ is selected as missing, the time period following may be any of $t_{+1+y}$, where y is some value greater than zero and less than a defined maximum. Based upon the disclosure provided herein, one of ordinary skill in the art will appreciate a variety of values that may be used for the defined maximum. In accordance with different embodiments.

Where either the location of the device is not known for a preceding time period (block 606) or for a following time period (block 608), the location of the device location for the selected time point is considered unresolvable and processing is returned to block 602). Alternatively, where the location of the device is known for both a preceding time period (block 606) or for a following time period (block 608), the device location is extrapolated between the preceding time point and the following time point assuming a constant rate of movement from the location corresponding to the preceding time point and the location corresponding to the following time point for all time points between the preceding time point and the following time point (block 610). The location timeline is then updated to include the extrapolated location for each missing time point between the preceding time point and the following time point (block 612). The process is then returned to block 602 and all processes are repeated until either the location timeline is complete or any missing time points are determined to be unresolvable.

While embodiments of the present disclosure have been illustrated and described, numerous modifications, changes, variations, substitutions, and equivalents will be apparent to those skilled in the art. Thus, it will be appreciated by those of ordinary skill in the art that the diagrams, schematics, illustrations, and the like represent conceptual views or processes illustrating systems and methods embodying various non-limiting examples of embodiments of the present disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing the particular embodiment. Those of ordinary skill in the art further understand that the example hardware, software, processes, methods, and/or operating systems described herein are for illustrative purposes and, thus, are not intended to be limited to any particular name. While the foregoing describes various embodiments of the disclosure, other and further embodiments may be devised without departing from the basic scope thereof.

What is claimed is:

1. A method for tracking a device through a region, the method comprising:
    receiving, by a processing resource, a device identification information from a first wireless access point at a first location, wherein the device identification information from the first wireless access point corresponds to a first time, and wherein the first wireless access point has a first region of coverage;
    receiving, by the processing resource, the device identification information from a second wireless access point at a second location, wherein the device identification information from the second wireless access point corresponds to a second time, and wherein the second wireless access point has a second region of coverage;
    receiving, by the processing resource, at least a first video from a first camera, wherein a field of view of the first camera includes at least a portion of the first region of coverage; and
    assembling, by the processing resource, a travel path of the device identification information including the first location and the second location, and at least a portion of the first video within a time window around the first time.

2. The method of claim 1, wherein a length of the time window is user programmable.

3. The method of claim 1, the method further comprising:
    receiving, by the processing resource, at least a second video from a second camera, wherein a field of view of the second camera includes at least a portion of the second region of coverage; and
    wherein the travel path further includes at least a portion of the second video corresponding to the second time.

4. The method of claim 3, wherein the time window is a first time window, and wherein the first time is before the second time, the method further comprising:
    replaying, by the processing resource, the travel path including simultaneously displaying the first video in a first display window on a display and the second video in a second display window on the display, wherein the first display window is accentuated compared with the second display window during a second time window around the first time, and the second display window is accentuated compared with the first display window during a third time window around the second time.

5. The method of claim 4, wherein accentuating the first window compared with the second window includes maximizing the first window to cover the entire screen of the display.

6. The method of claim 1, the method further comprising:
    receiving, by the processing resource, at least a second video from a second camera, wherein a field of view of the second camera includes at least a portion of the first region of coverage; and
    wherein the travel path further includes at least a portion of the second video corresponding to the first time.

7. The method of claim 6, wherein the time window is a first time window, wherein associating the device identification information with the image of the individual comprises:
    identifying, by the processing resource, the device identification information within the first region of coverage within a second time window around a time when the individual has been identified within the first video.

8. The method of claim 1, the method further comprising:
    associating, by the processing resource, the device identification information with an image of an individual.

9. The method of claim 1, wherein the first location and the second location are within a security zone, the method further comprising:
    providing, by the processing resource, an alert to a monitoring system when the device identification information is within the security zone.

10. The method of claim 1, wherein the device identification information is a media access control (MAC) address.

11. A system for tracking devices through a region, the system comprising:
- a processing resource;
- a non-transitory computer-readable medium coupled to the processing resource, wherein the non-transitory computer-readable medium has stored thereon instructions that when executed by the processing resource cause the processing resource to:
  - receive a device identification information from a first wireless access point at a first location, wherein the device identification information from the first wireless access point corresponds to a first time, and wherein the first wireless access point has a first region of coverage;
  - receive the device identification information from a second wireless access point at a second location, wherein the device identification information from the second wireless access point corresponds to a second time, and wherein the second wireless access point has a second region of coverage;
  - receive at least a first video from a first camera, wherein a field of view of the first camera includes at least a portion of the first region of coverage; and
  - assemble a travel path of the device identification information including the first location and the second location, and at least a portion of the first video within a time window around the first time.

12. The system of claim 11, wherein the device identification information is a media access control (MAC) address.

13. The system of claim 11, wherein the instructions further include instructions that when executed by the processing resource cause the processing resource to:
- receive at least a second video from a second camera, wherein a field of view of the second camera includes at least a portion of the second region of coverage; and
- wherein the travel path further includes at least a portion of the second video corresponding to the second time.

14. The system of claim 11, wherein the time window is a first time window, wherein the first time is before the second time, and wherein the instructions further include instructions that when executed by the processing resource cause the processing resource to:
- replay the travel path including simultaneously displaying the first video in a first display window on a display and the second video in a second display window on the display, wherein the first display window is accentuated compared with the second display window during a second time window around the first time, and the second display window is accentuated compared with the first display window during a third time window around the second time.

15. The system of claim 14, wherein accentuating the first window compared with the second window includes maximizing the first window to cover the entire screen of the display.

16. The system of claim 11, wherein the instructions further include instructions that when executed by the processing resource cause the processing resource to:
- receive at least a second video from a second camera, wherein a field of view of the second camera includes at least a portion of the first region of coverage; and
- wherein the travel path further includes at least a portion of the second video corresponding to the first time.

17. The system of claim 11, wherein the instructions further include instructions that when executed by the processing resource cause the processing resource to:
- associate the device identification information with an image of an individual.

18. The system of claim 17, wherein the time window is a first time window, wherein the instructions for associating the first device identification information with the image of the individual include instructions that when executed by the processing resource cause the processing resource to:
- identifying the device identification information within the first region of coverage within a second time window around a time when an individual has been identified within the first video.

19. The system of claim 11, wherein the first location and the second location are within a security zone, and wherein the instructions further include instructions that when executed by the processing resource cause the processing resource to:
- provide an alert to a monitoring system when the device identification information is within the security zone.

20. A non-transitory computer-readable storage medium embodying a set of instructions, which when executed by one or more processing resources of a computer system, causes the one or more processing resources to perform a method comprising:
- receiving a device identification information from a first wireless access point at a first location, wherein the device identification information from the first wireless access point corresponds to a first time, and wherein the first wireless access point has a first region of coverage;
- receiving the device identification information from a second wireless access point at a second location, wherein the device identification information from the second wireless access point corresponds to a second time, and wherein the second wireless access point has a second region of coverage;
- receiving at least a first video from a first camera, wherein a field of view of the first camera includes at least a portion of the first region of coverage; and
- assembling a travel path of the device identification information including the first location and the second location, and at least a portion of the first video within a time window around the first time.

* * * * *